United States Patent [19]
Omi et al.

[11] Patent Number: 5,211,635
[45] Date of Patent: May 18, 1993

[54] DRILL WITH TRIMMING ATTACHMENT

[75] Inventors: Takashi Omi; Shohei Omi, both of Anjo, Japan

[73] Assignee: Omi Kogyo Co., Ltd, Japan

[21] Appl. No.: 814,120

[22] Filed: Dec. 26, 1991

[30] Foreign Application Priority Data

Jun. 25, 1991 [JP] Japan .................. 3-153526

[51] Int. Cl.⁵ .............................. B23B 51/10
[52] U.S. Cl. .................... 408/224; 408/191; 408/713
[58] Field of Search ............. 408/117, 118, 199, 200, 408/223, 224, 225, 229, 230, 233, 713, 191

[56] References Cited

U.S. PATENT DOCUMENTS

| 2,340,941 | 2/1944 | Dietz . | |
|---|---|---|---|
| 3,266,344 | 8/1966 | Supernor . | |
| 3,877,099 | 4/1975 | Halpern | 408/117 |
| 4,533,285 | 8/1985 | Jorgensen | 408/224 |
| 5,071,295 | 12/1991 | Greig | 408/201 |

FOREIGN PATENT DOCUMENTS

| 391695 | 10/1990 | European Pat. Off. . | |
|---|---|---|---|
| 3610016 | 10/1987 | Fed. Rep. of Germany | 408/713 |
| 2359670 | 3/1978 | France | 408/225 |
| 59-15200 | 4/1984 | Japan . | |
| 152004 | 8/1984 | Japan | 408/117 |
| 216709 | 8/1989 | Japan | 408/224 |
| 2-41809 | 2/1990 | Japan . | |

Primary Examiner—Daniel W. Howell
Attorney, Agent, or Firm—Stetina and Brunda

[57] ABSTRACT

A drill and trimming attachment assembly is disclosed for drilling holes with beveled top openings in a work piece. The assembly includes a drill shaft with at least one longitudinally extending groove formed therein. A trimming attachment suitable for clamping to the drill shaft is also provided to form a beveled recess at the top of a hole formed by the drill. The trimming attachment includes a body and a trimming blade having base and arm portions. The base portion of the trimming blade is detachably secured to the body, and the body is arranged to be removably journaled about and clamped to the shaft of the drill such that an edge of the arm portion of the trimming blade is closely received by the groove. Thus, during use, the groove carries at least a portion of the load acting against the trimming blade.

16 Claims, 7 Drawing Sheets

DRILL WITH TRIMMING ATTACHMENT

BACKGROUND OF THE INVENTION

This application claims the priority of Japanese Patent Application No. 3-153526 filed Jun. 25, 1991, which is incorporated herein by reference.

1. Field of the Invention

This invention relates to a drill having a trimming attachment for forming a frusto-conical shaped recess at the opening edge of the hole formed during drilling.

2. Description of the Related Art

FIG. 4 shows a known drill trimming attachment. As seen therein a trimming attachment 33 is attached to the shaft 32 of a drill 31. The trimming attachment 33 consists of a cylindrical body 34 that is clamped to the drill 31 and a trimming blade 36 for trimming the opening edge of a drilled hole 37 to provide a frusto-conical tapered surface 28. The inner surface 35 of the trimming blade 36 abuts against the shaft 32 of the drill, while the base thereof is supported and fixed in the body 34.

Other generally known drills with trimming attachments generally have the drill and the trimming attachment formed as an integral body. Yet another has a trimming blade formed integrally with the bottom of a cylindrical body that is clamped to the drill. When a work piece is drilled using any of these types of drills, the drill can form a hole 37 and also chamfer the opening edge of the hole 37 to provide a frusto conical tapered surface 38.

In the drill with a trimming attachment of the type shown in FIG. 4, the trimming blade 36 is fixed to the shaft 32 of the drill by allowing the inner surface 35 of the trimming blade 36 to abut against the circumference of the shaft 32 and by supporting and fixing the base thereof in the body 34. Accordingly, the tip portion of the trimming blade 36 cannot be secured to the shaft, although the base thereof can be securely fixed. Thus, the trimming blade 36 is sometimes flexed or deflected by the force applied thereto during the chamfering operation. If a work piece is drilled in such state, the work piece suffers a poor appearance at the tapered surface 38, since the opening edge of the hole 37 cannot be chamfered neatly.

On the other hand, drills having a trimming cutter formed integrally therewith, by shaping a piece of bar-like material suffers a problem in that the production cost is high since machining thereof is very difficult. On the other hand, the drill with a trimming attachment of the type having the trimming blade formed integrally with the body 34 at the bottom thereof also suffers a problem in that it requires a number of bodies 34 corresponding to the number of drills with different outer diameters since the outer diameter of the drill which is acceptable in the body 34 is limited, again leading to a high cost of parts.

SUMMARY OF THE INVENTION

Accordingly, it is a primary object of this invention to provide a drill with a trimming attachment that can firmly be secured on the drill and which can be produced at a low cost and with reduced part cost.

To achieve the foregoing and other objects and in accordance with the purpose of the present invention, a drill and trimming attachment assembly is provided for drilling holes with beveled top openings in a work piece. The assembly includes a drill shaft with at least one longitudinally extending groove formed therein. A trimming attachment suitable for clamping to the drill shaft is also provided to form a beveled recess at the top of a hole formed by the drill. The trimming attachment includes a body and a trimming blade having base and arm portions. The base portion of the trimming blade is detachably secured to the body, and the body is arranged to be removably journaled about and clamped to the shaft of the drill such that an edge of the arm portion of the trimming blade is closely received by the groove. Thus, during use, the groove carries at least a portion of the load acting against the trimming blade.

In one preferred embodiment, the drill shaft includes a plurality of helical flutes and a plurality of longitudinally extending grooves. The grooves are defined at axially and circumferentially staggered positions about the periphery of the shaft. Further, the body includes a plurality of separate blocks and a plurality of bolts for combining these blocks together. The base portion of the trimming blade is fixed to the body at a position between two of the blocks and is secured by one of said bolts which passes through the through hole. An edge of the arm portion of the trimming blade is then place in a selected one of the longitudinal grooves.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DETAILED DESCRIPTION OF THE PREFERRED EMBODIMENTS

Figure 1:
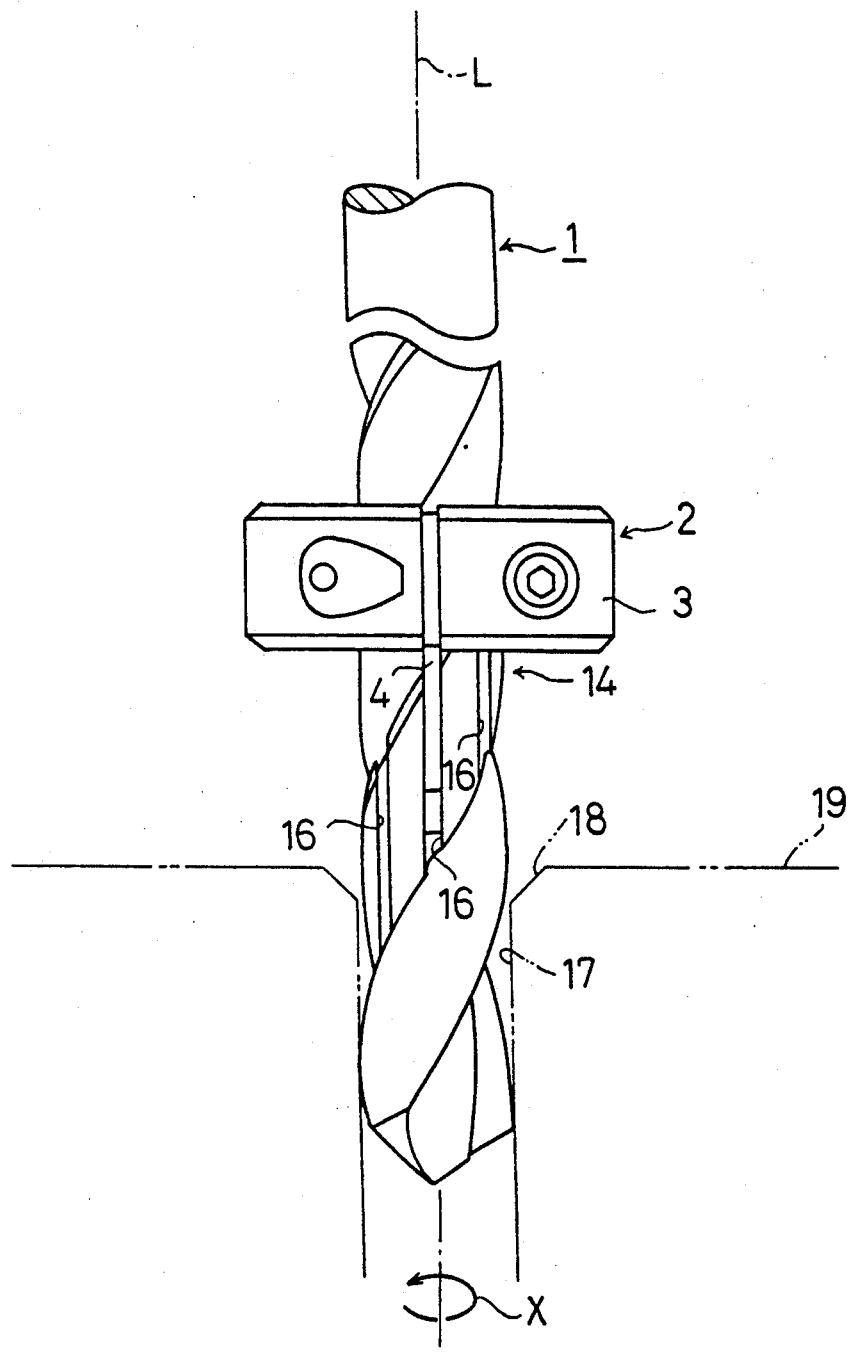
FIG. 1 shows in front view one embodiment of this invention, illustrating a drill having a trimming attachment clamped thereto.

A first embodiment of the drill with a trimming attachment according to this invention will be described referring to FIGS. 1 to 3. As shown in FIG. 1, the drill with a trimming attachment consists of a drill 1 and a trimming attachment 2. As shown in FIG. 3, the trimming attachment 2 consists of a cylindrical body 3 and a trimming blade 4 for trimming the opening edge of a drilled hole. The body 3 is divided into three parts so that the inner diameter thereof may be changed and that the base of the trimming blade 4 may be secured therebetween.

The blocks 5, 6 and 7 constituting the body 3 each have a threaded hole 11, and these blocks 5,6,7 can be combined by screwing bolts 8, 9 and 10 into the respective threaded holes 11. The trimming blade 4 is an elongated and thin plate. The base of the trimming blade 4 has a through hole 12 at a position corresponding to the threaded hole 11, while the tip thereof has a cutting edge 13 formed at a predetermined angle (<90°) based on the axis L shown in FIG. 1. The trimming blade 4 is fixed in the body 3 being held between any arbitrary two blocks and secured by the bolt inserted through the through hole 12.

Figure 2:
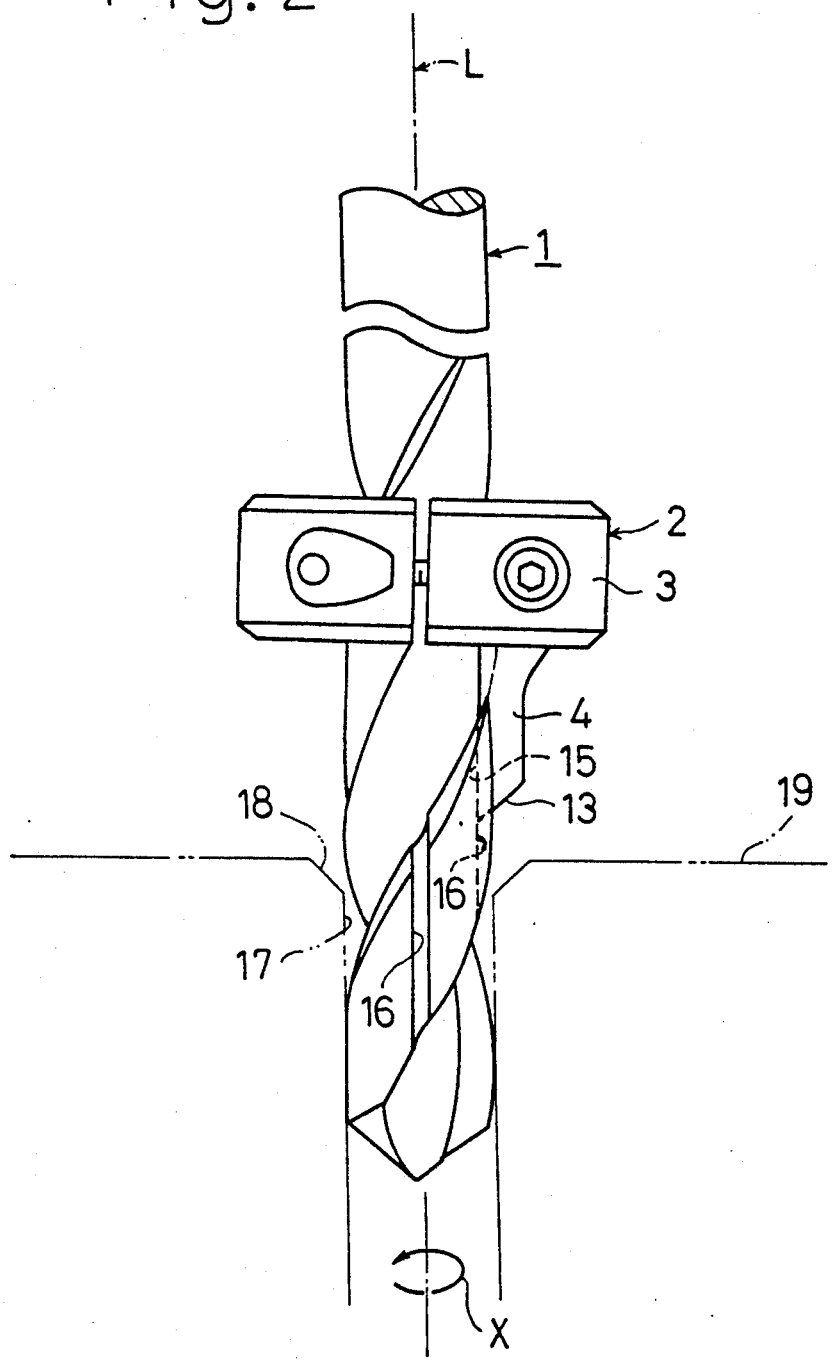
FIG. 2 shows a side view of the drill shown in FIG. 1 having a trimming attachment clamped thereto.
Figure 3:
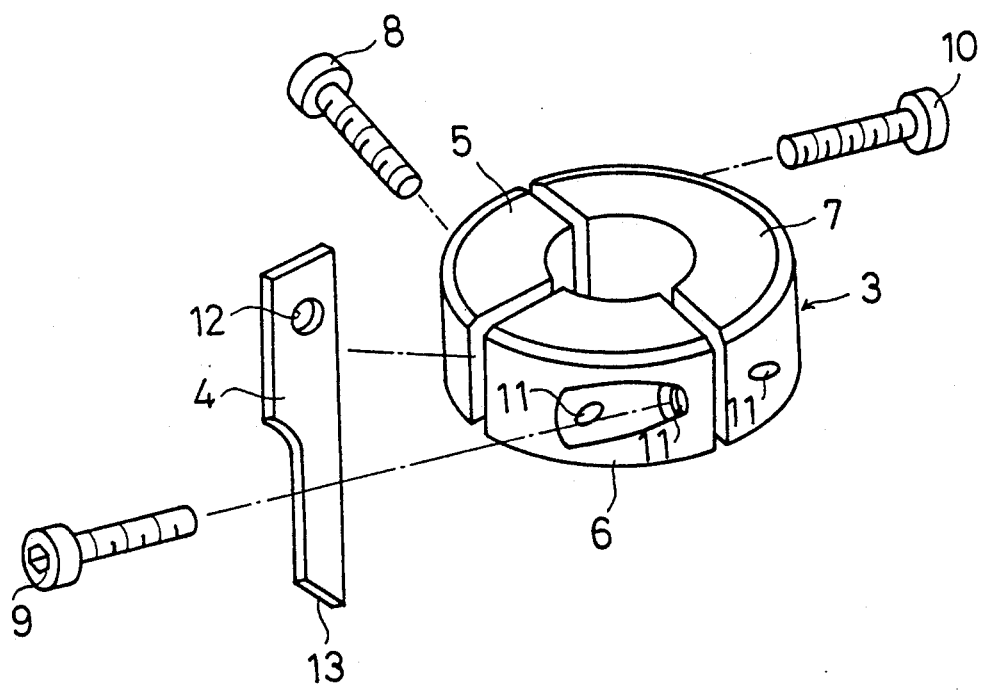
FIG. 3 shows an exploded perspective view of the trimming attachment shown in FIG. 1.
Figure 4:
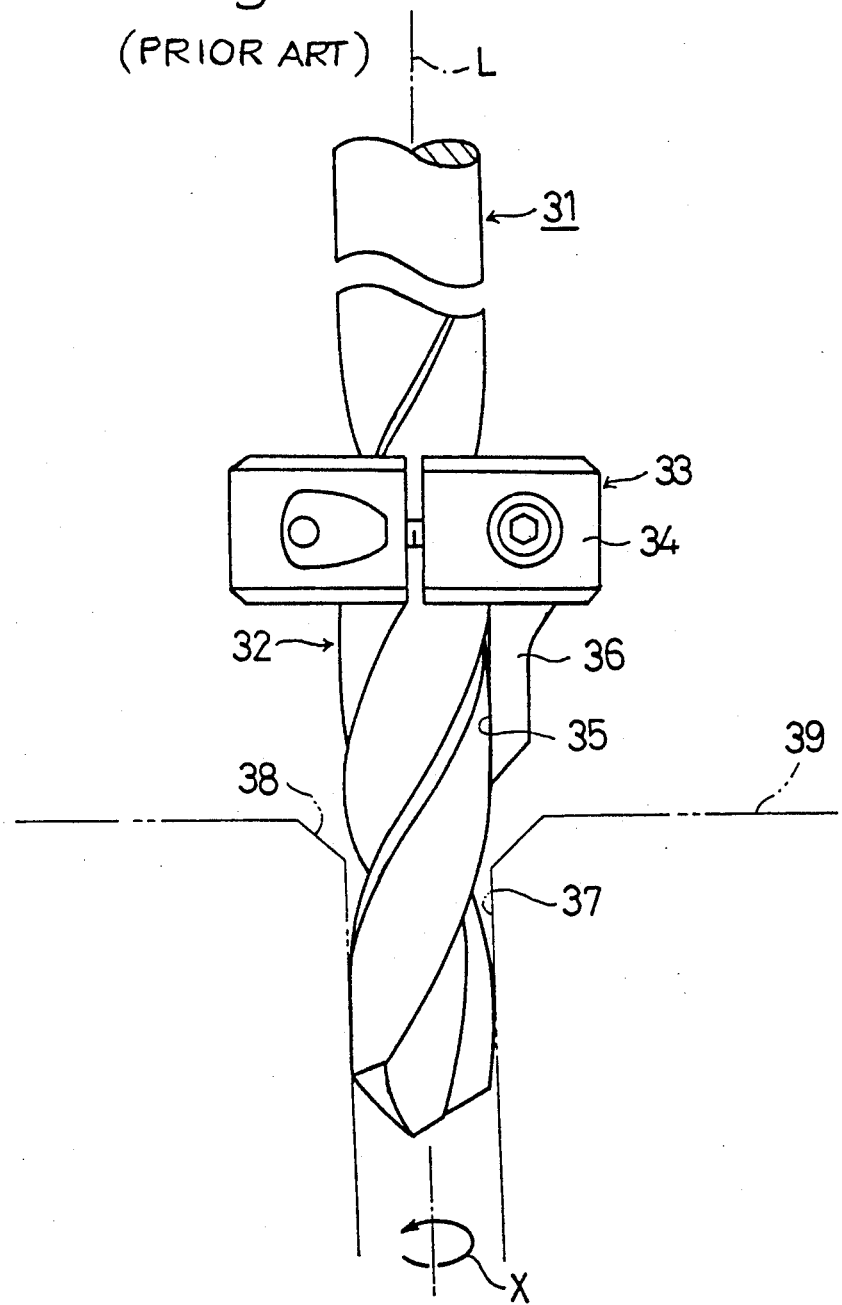
FIG. 4 shows a side view of a prior art trimming attachment.

As shown in FIG. 2, the shaft 14 of the drill 1 has a predetermined length of three grooves 16, for catching the inner surface 15 of the trimming blade 4 therein, formed along the axis L at staggered positions. These grooves 16 have a sufficient depth (about 0.5 mm in this embodiment) and a width approximately the same as the thickness of the trimming blade 4 so that the inner surface 15 of the trimming blade 4 may firmly be secured therein.

Next, action of this embodiment will be described. The three blocks 5,6,7 are combined by three bolts 8,9,10 with the base of the trimming blade 4 being supported between the two blocks 5,6 to fix the trimming blade 4 to the body 3. The inner diameter of the body 3 can be adjusted by tightening or loosening the bolts 8,9,10. The bolts 8,9,10 of the trimming attachment 2 are loosened a little to provide an inner diameter greater than the outer diameter of the drill 1, and then the trimming attachment 2 is applied to the drill 1.

After the inner surface 15 of the trimming blade 4 is engaged in the groove 16 of the drill 1, the bolts 8,9,10 are tightened again, and thus clamping of the trimming attachment 2 to the drill 1 is completed.

When drilling and trimming is carried out using the drill 1 having the trimming attachment 2 clamped thereto, the drill 1 is first mounted to the chuck (not shown) of, for example, a drilling machine. Then, the free end of the drill 1 is abutted against a work piece 19 while the drill 1 is rotated in the rotational direction X, whereby a tapered surface 18 can be formed along the opening edge of a hole 17 as it is formed by the drill 1.

According to the above embodiment, the trimming attachment 2 is clamped to the drill 1 with the base of the trimming blade 4 being supported by the body 3, while the inner surface 15 of the arm portion of the trimming blade 4 is received by the groove 16 of the drill 1. Thus, flex or deflection of the trimming blade 4 to be caused by the force applied to the side face thereof can be reduced to achieve trimming more neatly than by the conventional drill. Additionally, damage of the trimming blade 4 can be prevented. Moreover, these three grooves 16 formed axially at staggered positions allow wide selection of the position of fixing the trimming attachment 2 along the axis L, so that trimmed holes 17 having a variety of depths can be formed.

It should be noted that the above embodiment can be modified or varied as follows:

1) The number of the blocks in the body 3 of the trimming attachment 2 may be increased or decreased.

2) The number of the grooves 16 may be increased or decreased.

A second embodiment of this invention in which the drill 1 is a burnishing drill 52 will now be described referring to FIGS. 5 to 8. In the described embodiment, the burnishing drill 52 is a reamer which can achieve drilling and burnishing of the inner surface of the drilled hole at the same time. The drill 52 consists of a shank 53 and a shaft 54. The shaft 54 has on the circumference thereof a pair of drilling grooves 55 for discharging chips and a plurality (two pairs in this embodiment) of reamer grooves 56 for discharging coolant, all extending substantially parallel to the axis L and one another.

Figure 5:
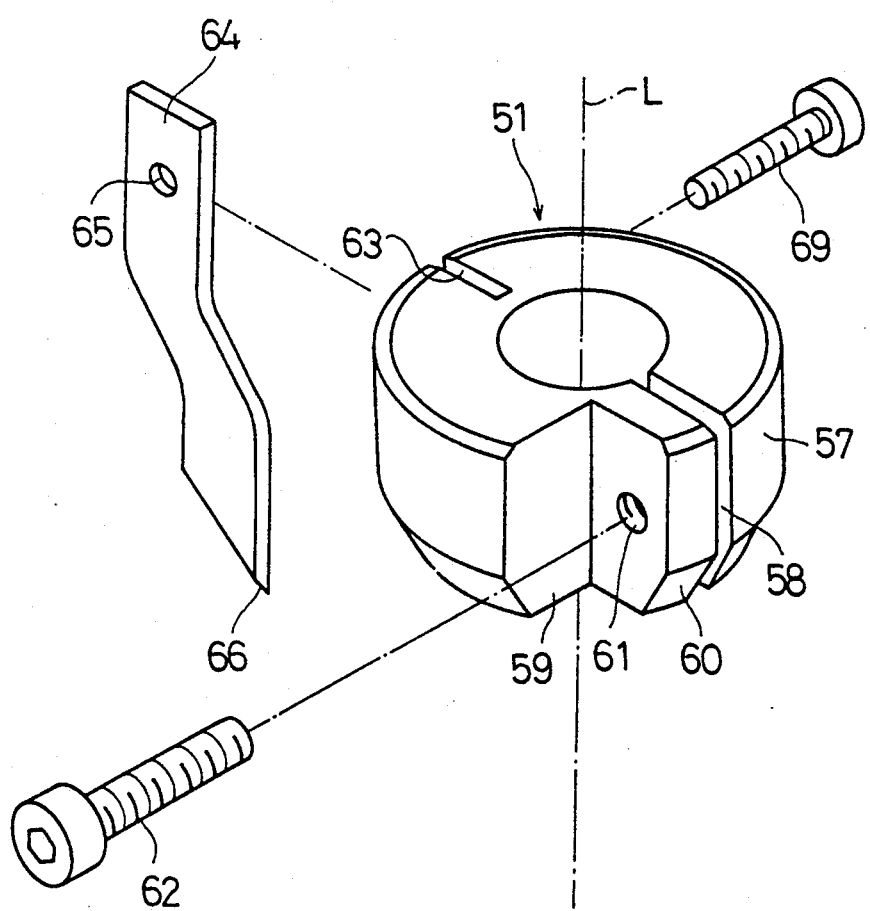
FIG. 5 shows in exploded perspective view of a second embodiment of the present invention.

The trimming attachment 51 shown in FIG. 5 has a substantially annular body 57 which can be fitted on the shaft 54 of the drill 52. The diameter of the body 57 can be reduced or increased by the slit 58 formed along the axis L.

If the rotational direction of the drill 52 is expressed by X, a notch 59 is formed in the body 57 ahead of the slit 58 in terms of the rotational direction X. A threaded hole 61 is formed along the tangential line in the support piece 60, defined by the notch 59 and the slit 58 and through the body 57 at a position behind the slit 58 in terms of the rotational direction X. Accordingly, the body 57 can be clamped to the drill 52 by reducing the diameter of the body 57 by screwing a bolt 62 into the threaded hole 61.

A narrow recess 63 is formed in the body 57 along the axis L at a position opposite to the slit 58. The upper half or base of the trimming blade 64 is engaged in this recess 63. The trimming blade 64 has a thin and elongated plate-like form. A through hole 65 for fitting a bolt 69 therein is formed at an upper position of the trimming blade 64, and also a cutting edge 66 is formed at the lower end thereof at a predetermined angle based on the axis L. With the upper half of the trimming blade 64 being engaged in the recess 63 of the body 57, the lower half of the trimming blade 64 can be engaged at one side in the reamer groove 56 of the drill 52 (see FIG. 6).

Figure 8:
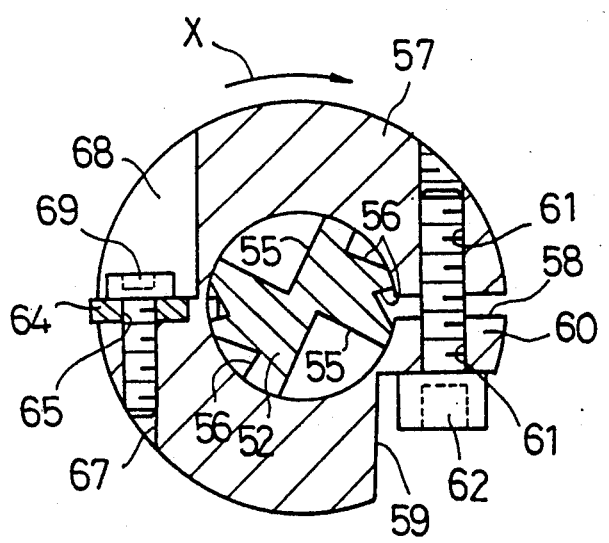
FIG. 8 shows an enlarged cross section taken along the line VIII—VIII in FIG. 7.

As shown in FIG. 8, a through hole 68 and a threaded hole 67 are formed ahead of the recess 63 and behind the recess 63, respectively, in terms of the rotational direction X. The bolt 69 inserted through the through hole 68 is screwed into the through hole 65 of the trimming blade 64 and the threaded hole 67 of the body 57.

When the trimming attachment 51 is clamped to the drill 52, the bolts 62,69 and the trimming blade 64 are preliminarily fitted to the body 57, respectively. However, the bolts 62,69 are fitted loosely. Subsequently, with the inner diameter of the body 57 being greater than the outer diameter of the drill 52, the trimming attachment 51 is positioned relative to the drill 52 in such a way that the trimming blade 64 may be engaged with a reamer groove 56.

The body 57 is then fitted slowly onto the shaft 54 of the drill 52. Since the diameter of the body 57 is enlarged and the trimming blade 64 can slide on the shaft 54, the fitting operation can be facilitated. Now that the trimming attachment 51 is moved to a predetermined position, the bolt 62 is securely tightened, whereby the body 57 is contracted to allow the inner surface of the body 57 to be in contact tightly with the circumference of the shaft 54 of the drill 52. Accordingly, the trimming attachment 51 can firmly be clamped to the drill 52 with the aid of the tightening force of the bolt 62.

The bolt 69 is then securely tightened after confirming that the lower half of the trimming blade 64 is engaged in the reamer groove 56. The trimming blade 64 is engaged with the recess 63 and the reamer groove 56 by the secure tightening of the bolt 69, so that the slippage of the trimming blade 64 not only in the rotational direction X but also in the axial direction L can be prevented.

As described above, the trimming attachment 51 can securely be clamped to the drill 52 by a simple operation according to this invention.

In the above embodiment, the body 57 and the trimming blade 64 are of separate members. Accordingly, the body 57, bolts 62 and 69, etc. can be used in common with other trimming blades 64. The trimming attachment 51 can be clamped to those drills having different shapes of reamer grooves 56 only by replacing the trimming blade 64.

Figure 6:
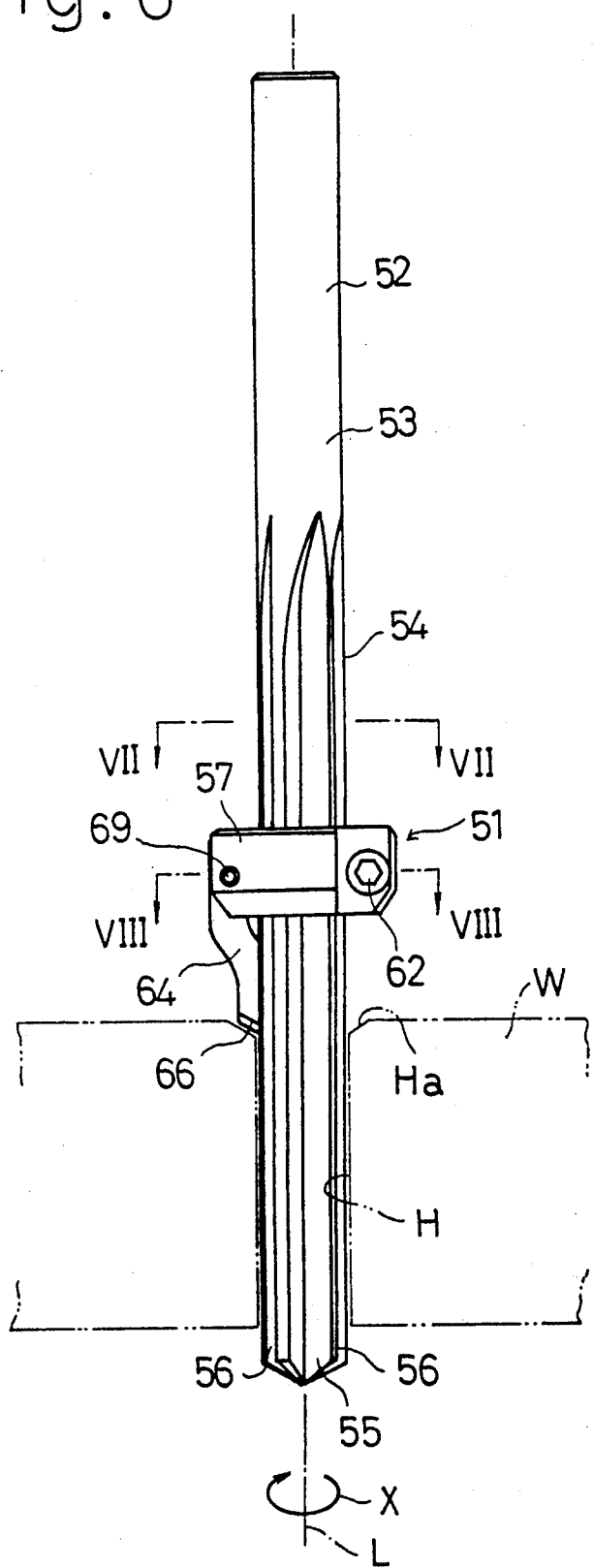
FIG. 6 shows a front view of a burnishing drill having the trimming attachment shown in FIG. 5 clamped thereto.
Figure 7:
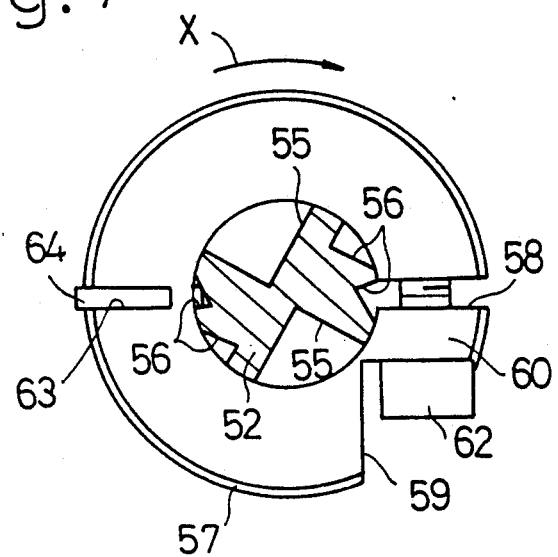
FIG. 7 shows an enlarged cross section taken along the line VII—VII in FIG. 6.

When drilling and trimming are carried out using the drill 52 with a trimming attachment 51, the tip of the drill abuts against a work piece W, like in the first embodiment, while the drill 52 is rotated in the rotational direction X. Thus, a hole H is formed in the work piece W by the drill 52, as shown in FIG. 6. In this process, chips are discharged through the drilling groove 55 of the drill 52. However, since the trimming blade 64 is engaged in the reamer groove 56, the trimming blade 64 never interferes with discharging of chips to allow smooth drilling operation by the drill 52.

When the drill 52 has passed sufficiently through the hole, the cutting edge 66 of the trimming blade 64 abuts against the opening edge of the hole H, and thus a frusto-conical shaped beveled surface Ha having an inner diameter greater than that of the hole H can be formed along the opening edge of the hole H by the cutting edge 66. In this process, since the trimming blade 64 is secured to the drill 52 accurately in position and rotated integrally with the drill 52, the work piece W can accurately be trimmed by the cutting edge 66 of the trimming blade 64.

As has been described above, the trimming attachment 51 according to this embodiment can easily be clamped to the drill 52 and allows formation of a hole H by the drill or reaming of a drilled hole H and formation of a tapered surface Ha along the opening edge of the hole H. Accordingly, a series of machining operations can be facilitated.

Incidentally, in the above embodiment, it is also possible to increase the number of recess 63, threaded hole 61 and bolt 62 so as to fix a plurality of trimming blades 64 to the body 57.

What is claimed is:

1. A drill with a trimming attachment for forming a hole in a work piece, which comprises:
    a drill shaft;
    a longitudinally extending groove formed in the shaft of the drill; and
    a trimming attachment suitable for clamping to the drill shaft for forming a beveled recess at the top of a hole formed by the drill, the trimming attachment including a body having a plurality of separate blocks and plurality of bolts for combining the blocks together, and a trimming blade having base and arm portions, the base portion of the trimming blade being detachably secured to the body, and said body being arranged to be removably journaled about and clamped to the shaft of the drill such that an edge of the arm portion of the trimming blade is closely received by said groove such that during use, the groove carries at least a portion of the load acting against the trimming blade;
    wherein the trimming blade has a through hole defined at the base portion thereof and is fixed to the body at a position between two of the blocks and is secured by one of said bolts which passes through the through hole.

2. The drill according to claim 1, wherein the trimming blade has a cutting edge formed at an acute angle relative to a rotational axis of the drill shaft.

3. The drill according to claim 1, wherein the shaft has a plurality of grooves defined at axially and circumferentially staggered positions about the periphery of the shaft, and wherein the trimming blade may be selectively engaged in any of said grooves.

4. The drill according to claim 1, wherein the drill is a burnishing drill having a plurality of axially extending parallel drilling grooves and reamer grooves.

5. The drill according to claim 4, wherein the body has an annular shape and has a slit extending along the axis of the body, and the body can be secured to the shaft of the drill by fitting it thereon and making the clearance of the slit narrower.

6. The drill according to claim 5, wherein:
    the body has a recess extending along the axis of the drill, which the base of the trimming blade is inserted into and fixed to; and
    the groove that receives the arm of the trimming blade is one of said reamer grooves.

7. A drill with a trimming attachment for forming a hole in a work piece, which comprises:
    a drill shaft having a plurality of helical flutes and a plurality of longitudinally extending grooves defined at axially and circumferentially staggered positions about the periphery of the shaft; and
    a trimming attachment suitable for clamping to the drill shaft for forming a beveled recess at the top of a hole formed by the drill, the trimming attachment including,
    a) a body arranged to be removably journaled about and clamped to the shaft of the drill, the body including a plurality of separate blocks and a plurality of bolts for coupling the blocks together; and
    b) a trimming blade having base and arm portions, the base portion of the trimming blade having a through hole defined therein and being detachably secured to the body at a position between two of the blocks, by one of said bolts which passes through the through hole; and
    wherein an edge of the arm portion of the trimming blade is closely received by a selected one of said grooves such that during use, the groove carries at least a portion of the load acting against the trimming blade.

8. The drill according to claim 7, wherein the trimming blade has a cutting edge formed at an acute angle relative to the rotational axis of the drill shaft.

9. A drill with a trimming attachment for forming a hole in a work piece, which comprises:
    a drill shaft;
    a longitudinally extending groove formed in the shaft of the drill; and
    a trimming attachment suitable for clamping to the drill shaft for forming a beveled recess at the top of a hole formed by the drill, the trimming attachment including a body having a plurality of separate blocks and plurality of attachment means for combining the blocks together, and a trimming blade having base and arm portions, the base portion of the trimming blade being detachably secured to the body, and said body being arranged to be removably journaled about and clamped to the shaft of the drill such that an edge of the arm portion of the trimming blade is closely received by said groove such that during use, the groove carries at least a portion of the load acting against the trimming blade;

wherein the trimming blade has a through hole defined at the base portion thereof and is fixed to the body at a position between two of the blocks and is secured by said attachment means which passes through the through hole.

10. A drill with a trimming attachment for forming a hole in a work piece, which comprises:

a drill shaft having a plurality of helical flutes and a plurality of longitudinally extending grooves defined at axially and circumferentially staggered positions about the periphery of the shaft; and a trimming attachment suitable for clamping to the drill shaft for forming a beveled recess at the top of a hole formed by the drill, the trimming attachment including:
  a) a body arranged to be removably journaled about and clamped to the shaft of the drill, the body including a plurality of separate blocks and attachment means for coupling the blocks together; and
  b) a trimming blade having base and arm portions, the base portion of the trimming blade having a through hole defined therein and being detachably secured to the body at a position between two of the blocks, by said attachment means which passes through the through hole; and wherein an edge of the arm portion of the trimming blade is closely received by a selected one of said grooves such that during use, the groove carries at least a portion of the load acting against the trimming blade.

11. The drill according to claim 1 wherein said plurality of separate blocks comprises three separate blocks.

12. The drill according to claim 11 wherein:
  a) a first one of said three separate blocks extends approximately 180 degrees about said drill shaft;
  b) a second one of said three separate blocks extends approximately 90 degrees about said drill shaft; and
  c) a third one of said three separate blocks extends approximately 90 degrees about said drill shaft.

13. The drill according to claim 12 wherein said trimming blade is captured intermediate said second and third blocks.

14. The drill as recited in claim 1 wherein said plurality of separate blocks comprise two separate blocks and said trimming blade is captured intermediate said two separate blocks.

15. A tool comprising:

a trimming attachment suitable for clamping to a drill shaft for forming a beveled recess at the top of a hole formed by a drill, the trimming attachment including a body having a plurality of separate blocks and plurality of attachment means for combining the blocks together, and a trimming blade having base and arm portions, the base portion of the trimming blade being detachably secured to the body, and said body being arranged to be removably journaled about and clamped to the shaft of the drill such that an edge of the arm portion of the trimming blade is closely received by a groove formed in the drill shaft such that during use, the groove carries at least a portion of the load acting against the trimming blade;

wherein the trimming blade has a through hole defined at the base portion thereof and is fixed to the body at a position between two of the blocks and is secured by said attachment means which passes through the through hole.

16. A tool comprising:

a trimming attachment suitable for clamping to a drill shaft for forming a beveled recess at the top of a hole formed by a drill, the trimming attachment including:
  a) a body arranged to be removably journaled about and clamped to the shaft of the drill, the body including a plurality of separate blocks and attachment means for coupling the blocks together; and
  b) a trimming blade having base and arm portions, the base portion of the trimming blade having a through hole defined therein and being detachably secured to the body at a position between two of the blocks, by said attachment means which passes through the through hole; and wherein an edge of the arm portion of the trimming blade is closely received by a longitudinally extending groove formed in the drill shaft such that during use, the groove carries at least a portion of the load acting against the trimming blade.

* * * * *